United States Patent [19]
Kojima et al.

[11] Patent Number: 4,853,780
[45] Date of Patent: Aug. 1, 1989

[54] METHOD AND APPARATUS FOR PREDICTIVE CODING

[75] Inventors: Yuichi Kojima; Naohisa Kitazato, both of Kanagawa, Japan

[73] Assignee: Sony Corp., Tokyo, Japan

[21] Appl. No.: 154,881

[22] Filed: Feb. 11, 1988

[30] Foreign Application Priority Data

Feb. 27, 1987 [JP] Japan .................. 62-044413

[51] Int. Cl.$^4$ .............................................. H04N 7/12
[52] U.S. Cl. ................................... 358/136; 358/135; 341/143; 375/27
[58] Field of Search ............... 341/126, 143, 155, 156, 341/162, 165, 200, 50, 51, 76, 87, 93, 94; 332/9 R; 375/25, 26, 27, 30, 34, 60, 99, 103; 358/135, 136

[56] References Cited

U.S. PATENT DOCUMENTS

| | | | |
|---|---|---|---|
| 3,898,378 | 8/1975 | Hinoshita et al. | 358/136 |
| 4,385,393 | 5/1983 | Chaure et al. | 375/30 |
| 4,588,981 | 5/1986 | Senn | 341/143 |
| 4,791,404 | 12/1988 | Hollister | 358/138 |
| 4,792,787 | 12/1988 | Speiser et al. | 375/27 |

*Primary Examiner*—William M. Shoop, Jr.
*Assistant Examiner*—Brian Young
*Attorney, Agent, or Firm*—Alvin Sinderbrand

[57] ABSTRACT

In transmitting a residual signal determined by the difference between an input signal and a predictive signal, a comparative signal based on the input signal is applied to a plurality of predictors having different respective predictive functions or coefficients, the resulting predictive output signals from the predictors, respectively, are compared with the comparative signal to provide respective difference signals, and the predictor corresponding to the smallest of the difference signals with a predetermined time delay, for example, the next preceding sampling of the input signal, is employed as the source of the predictive signal to be subtracted from the input signal for determining the transmitted residual signal.

11 Claims, 5 Drawing Sheets

METHOD AND APPARATUS FOR PREDICTIVE CODING

BACKGROUND OF THE INVENTION

1. Field of the Invention

This invention relates to a predictive coding method and apparatus for use in the highly efficient coding of moving image signals, such as, television signals and the like.

2. Description of the Prior Art

A predictive coding system is known for effecting the efficient coding of moving image signals, such as, television signals, and the like. Such known predictive coding system, for example, as disclosed in "Digital Image Processing", by Rafael C. Gonzales and Paul Wintz, 1977, Addison-Wesley Publishing Co., Reading, Mass., at pages 278-279, includes encoding and decoding sections as generally shown in FIGS. 1 and 2, respectively, hereof.

The encoder is shown in FIG. 1 to comprise an input terminal 1, a subtractor 2, a requantizer 3, an adder 4, a predictive filter or predictor 5 and an output terminal 6. The terminal 1 receives a suitable digital input signal which is, for example, obtained by sampling a television signal, and which is applied to one input of the subtractor 2. Another input of the subtractor 2 receives the output of the predictive filter 5 which employs a predictive function or coefficient P(Z) for providing a predictive or current value from a comparative value or previous input digital data, for example, the next preceding sample. The subtractor 2 provides, at its output, a residual signal, that is, the difference between the value of the input signal supplied thereto from the input terminal 1 and the predictive value from filter 5. The residual signal from the subtractor 2 is supplied to the requantizer 3, wherein the residual signal is quantized and delivered to the output terminal 6. As the predicting accuracy of the filter 5 is increased, that is, as the predictive value from the output of the filter 5 becomes nearer to the value of the input signal from the terminal 1, the value of the residual signal is correspondly reduced and, accordingly, the information of output terminal 6 can be further compressed.

The quantized residual signal is also shown to be supplied to the adder 4 for adding to the predictive value from the predictive filter 5. The output from the adder 4, that is, the sum of the quantized residual signal or value and the predictive value, is supplied to the predictive filter 5 as a comparative value to be used in the prediction of the next input data sample.

The decoder employed in the known predictive coding system is shown in FIG. 2 to comprise an input terminal 7, an adder 8, a predictive filter or predictor 9 and an output terminal 10. The adder 8 adds a predictive value from the predictor 9 to the data of the quantized residual signal suitably transmitted from the output terminal 6 to the input terminal 7 to thereby decode the original sample data and deliver the same to the output terminal 10. The predictive filter or predictor 9 is similar to the predictor 5 of the encoder in that it employs a predictive function P(Z) to predict a current value from a comparative value or a previous input signal, for example, the decoded output from the adder 8 which corresponds to the next preceding sample.

The above-described known coding system, if it is applied to the coding of a television signal representing a moving image, transmits only those portions of the signal representing the movement and accordingly can effect a highly efficient coding of the television signal. By transmitting only a difference signal, that is, the difference between each input signal and the corresponding predictive value, the word length can be compressed. Further, the compression of the information is made possible by providing entropy encoding and decoding corresponding to the probability density distribution of the difference signal.

It is desirable, in the described predictive coding system, to improve the accuracy in the predictive function P(z) and to minimize the addition of squared residual signals for compressing the word length as well as for effectively applying the entropy or variable length coding. However, when the above described coding system is applied to an ordinary broadcasting television signal or the like, if only a single predictive function or coefficient is provided, it cannot cope with various statistical characteristics of the input signal which substantially vary with the lapse of time, so that the accuracy in the predictive function may be insufficient.

Thus, a system has been proposed in which the characteristics of a predictive function are varied in accordance with the statistical characteristics of an input signal. Further, a system has been proposed in which one of a plurality of different predictive functions is selectively used in accordance with the statistical characteristics of the input signal.

The systems which selectively employ a plurality of different predictive functions can be roughly classified into systems of the following two types:

(1) A system which selects an optimal predictive function for each pixel or each pixel block and which transmits the selection control information for the optimal predictive function along with the data indicative of the difference between an input signal and a predictive value; and (2) A system in which an encoder and a decoder each select an optimal predictive function without requiring the transmission of the selection control information.

In the case of a system of the type indicated at (1) above, if the selection control information for the optimal predictive function is transmitted for each pixel, an optimal predictive function can be selected for each pixel and the addition of squared residual signals is reduced to a minimum. However, the amount of transmitted information is increased by the amount of the transmitted selection control information. The amount of the selection control information to be transmitted may be decreased by selecting an optimal predictive function for each of a plurality of blocks each formed of a plurality of pixels. However, a predictive function thus selected for one block will not always be optimal for all of the individual pixels therein. In other words, if the block is made larger so that the amount of the transmitted selection control information is decreased, the amount of the residual signal that needs to be transmitted is increased. On the contrary, if the block is made smaller, the amount of the residual signal to be transmitted is decreased, but the amount of the selection control information to be transmitted is increased. Thus, problems remain whether the block size is made larger or smaller. Although it may be advantageous to make the block size variable, it would be difficult to devise the hardware for implementing such concept.

In the case of a system of the type indicated at (2) above, if it is possible to select an optimal or nearly optimal predictive function for each pixel in the encoder and the decoder of the system, the above-mentioned problems of the type (1) system can be solved. However, in the type (2) systems, it is difficult to derive the algorithm for selecting an optimal predictive function from a plurality of predictive functions.

In a proposed example of such selection algorithm for each of the encoder and decoder, an intermediate one of the amplitudes or values predicted by a plurality of predictive functions is selected, for example, as disclosed specifically in Telecommunication Technology, 1E83-83 published by Japan Institute of Electronics and Telecommunications. Although such algorithm can avoid the selection of the worst predictive value, the probability of selecting the best predictive value may be reduced for certain contents of images.

Further, even though the number of possible predictive functions is increased to improve the accuracy thereof, the advantages thereof may not be as pronounced as expected, since the described algorithm merely selects an intermediate value. In other words, the accuracy will not be improved in proportion to the increased number of the predictive functions from which the selection is made. Further, increasing the number of the predictive functions also results in undesirable complexities in the circuit arrangement for selecting the intermediate one of the predictive values. Moreover, this type of previously proposed predictive coding system carries out many operations for processing each pixel s that the hardware therefor has to have a high processing speed which is disadvantageous when the entire apparatus is to be integrated in a single chip.

OBJECTS AND SUMMARY OF THE INVENTION

Accordingly, it is an object of the present invention to provide a method and an apparatus for predictive coding which is capable of avoiding the above-described problems associated with the prior art.

It is another object of the present invention to provide a method and an apparatus for predictive coding which is capable of improving the information compression by selecting an optimal predictive filter from a plurality of predictive filters by utilizing the correlation of the predictive signals therefrom.

It is still another object of the present invention to provide a method and an apparatus for predictive coding which is capable of improving the information compression by precisely controlling a plurality of predictive filters.

It is a further object of the present invention to provide a method and an apparatus for predictive coding which is capable of improving the information compression without the necessity of transmitting predictive filter selection control information for selecting an optimal predictive filter from among a plurality of predictive filters.

It is still a further object of the present invention to provide a method and an apparatus for predictive coding, as aforesaid, which is capable of compressing the information at a relatively higher speed by decreasing the signal processing time.

It is yet a further object of the present invention to provide a method and an apparatus for predictive coding as aforesaid, which is capable of economically achieving the information compression by avoiding complication of the hardware required therefore even though the number of predictive filters is increased.

According to one aspect of the present invention, in a predictive encoding method for transmitting a signal indicative of the difference between an input signal and an output signal from a predictive filter selected from a plurality of predictive filters; a signal based on the input signal and which is supplied to the plurality of predictive filters is compared with respective output signals from the plurality of predictive filters, the one of the predictive filters whose output signal shows the least difference from the compared signal is selected with a predetermined time delay, and a signal indicative of the difference between the present output value from the selected predictive filter and the input signal is transmitted.

According to another aspect of the present invention, in a predictive decoding method for decoding an original signal from an input residual signal by adding to the latter a predictive signal; a decoded signal is supplied to a plurality of predictors or predictive filters having different respective predictive functions, the decoded signal is compared with each of a plurality of predictive output signals from the predictors, respectively, so as to obtain a plurality of respective difference signals, the one of the predictors corresponding to the smallest of the difference signals with a predetermined time delay is selected, and the input residual signal is added to the current predictive output signal from the selected predictor so as to obtain the decoded original signal.

The above, and other objects, features and advantages of the present invention, will become apparent from the following description of a preferred embodiment which is to be read in conjunction with the accompanying drawings forming a part hereof and in which the same reference numerals designate like elements and parts in the several views.

DESCRIPTION OF THE PREFERRED EMBODIMENT

Figure 1:
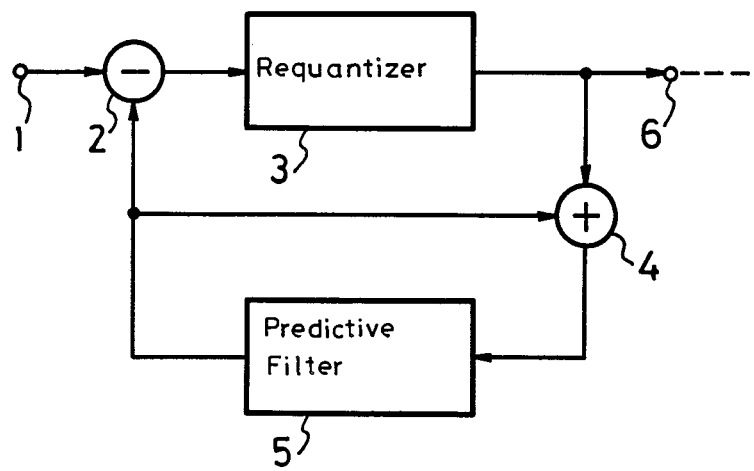
FIG. 1 is a circuit block diagram showing the previously described predictive encoder according to the prior art.
Figure 2:
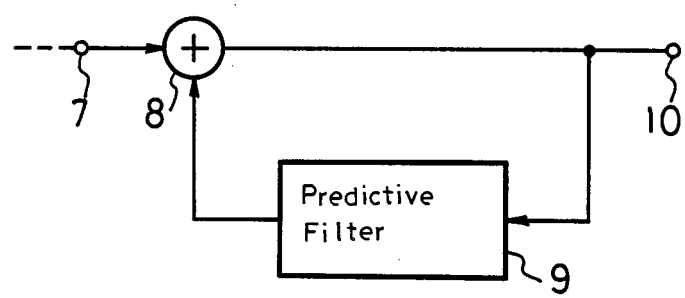
FIG. 2 is a circuit block diagram showing the previously described predictive decoder according to the prior art.

In order that the problems overcome by the present invention may be fully understood, reference will first be made to FIGS. 3 and 4 which show an encoder and a decoder, respectively, according to the prior art and in which it is intended that an optimal predictive function or coefficient should be selected from a plurality of predictive functions. It will be appreciated that the encoder and decoder of FIGS. 3 and 4 are similar to the previously described encoder and decoder, respectively, of FIGS. 1 and 2, and differ therefrom only in respect to the predictive filter circuits 50 and 90 (FIGS. 3 and 4) which replace the predictors or predictive filters 5 and 9, respectively.

Figure 3:
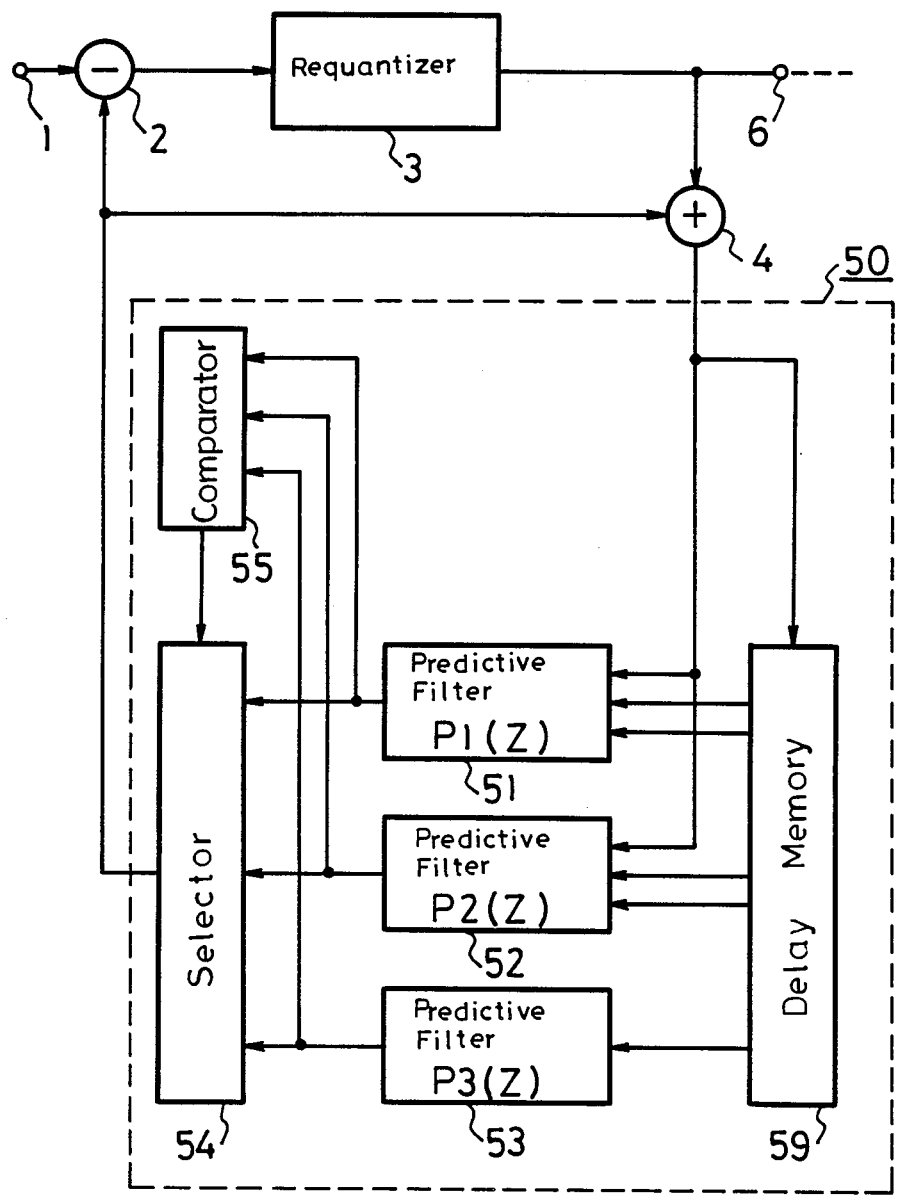
FIG. 3 is a circuit block diagram showing another example of a previously proposed predictive encoder in greater detail.
Figure 4:
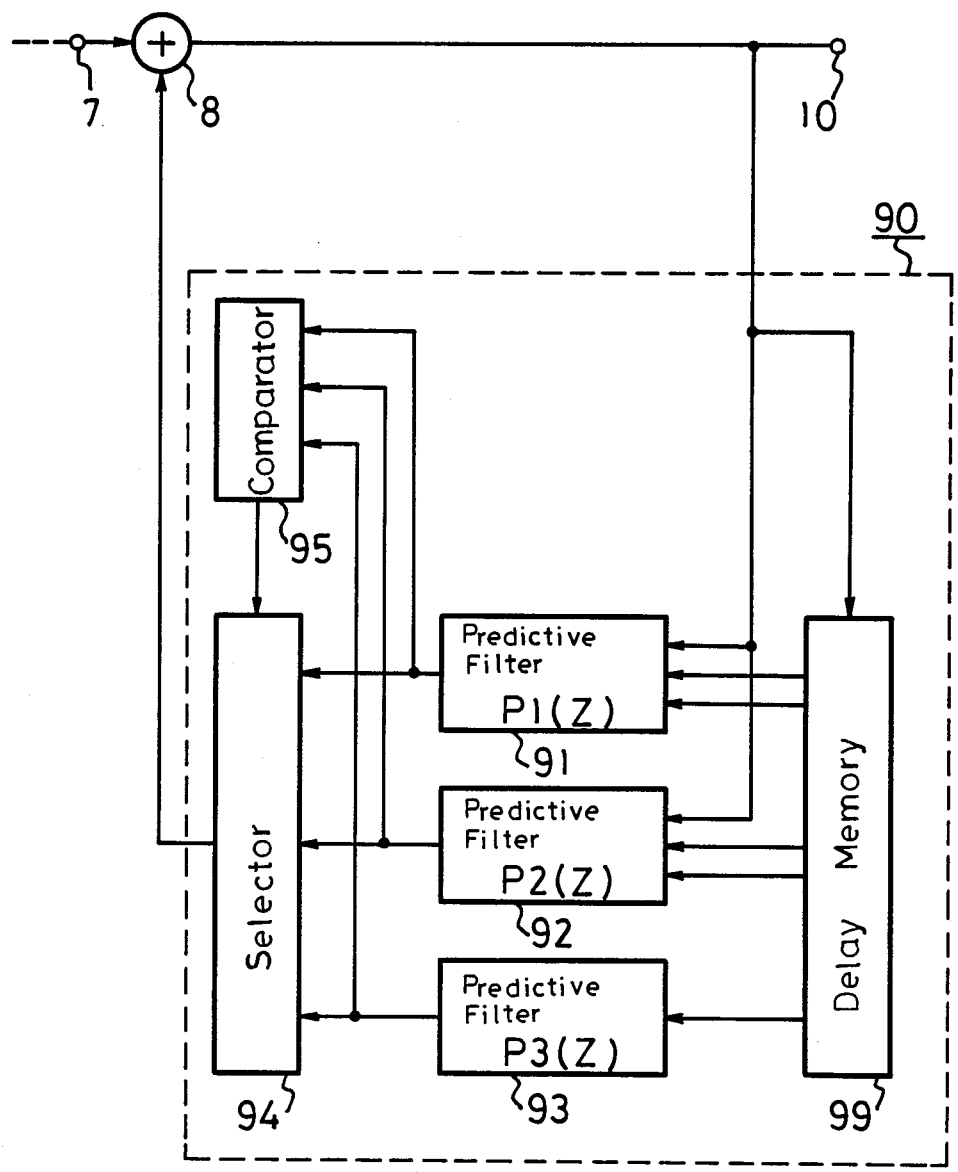
FIG. 4 is a circuit block diagram showing another example of the previously proposed predictive decoder in greater detail.

The predictive filter circuit 50 of the predictive encoder shown in FIG. 3 includes three kinds of predictive filters or predictors 51, 52 and 53 and a delay memory 59 for setting the amounts of delay required by the respective predictive filters. The predictive filter circuit 90 of the predictive decoder shown in FIG. 4, similarly includes predictive filters 91, 92 and 93 and a delay memory 99 for setting the amounts of delay required by the respective predictive filters.

If it is assumed that the predictive filters 51, 52 and 53, and 91, 92 and 93 are employed for encoding and decoding moving images, such predictive filters or predictors are respectively provided with three different predictive functions or coefficients P1(z) and P2(z) and P3(z), respectively, for example, as follows:

P1(z) for in-field prediction (suitable for images with rapid movement);

P2(z) for inter-frame prediction (suitable for images with little movement); and P3(z) for inter-field prediction (that is, having characteristics intermediate those of P1(z) and P2(z), respectively).

Predicted values provided by the predictive filters 51, 52 and 53 are supplied to a selector 54 and to a comparator 55. The comparator 55 compares the amplitudes or values of the several predictive output signals supplied thereto and supplies a selection control signal to the selector 54 so that the latter selects the intermediate one of the predicted values supplied thereto from the predictive filters 51, 52 and 53. Therefore, the predictive filter circuit 50 is operative to deliver to the subtractor 2 the intermediate one of the predictive values or output signals from the predictive filters or predictors 51, 52 and 53.

In the same manner, the predictive filters 91, 92 and 93 in the predictive filter circuit 90 of the predictive decoder of FIG. 4 supply a selector 94 and a comparator 95 with their respective predictive values or output signals. The selector 94 is controlled by a control signal from the comparator 95 so as to select the intermediate one of the predictive values or output signals delivered thereto from the predictive filters or predictors 91, 92 and 93.

The algorithm applied to the known encoder and decoder of FIGS. 3 and 4 for selecting the intermediate one of the predictive output signals from the plurality of the predictive filters is effective to avoid selection of the worst predictive value. However, the probability of selecting the predictor which provides the best or most accurate predictive value may be reduced for certain contents of images.

Further, even if the number of the predictive functions is increased to improve the accuracy, the advantages thereof will not be so pronounced as expected, since the described algorithm merely selects an intermediate value from among the predictive output signals provided by the several predictive filters or predictors. In other words, the accuracy will not be improved in proportion to the increased number of the predictive values or output signals from which the selection is made. Further, increasing the number of the predictive functions is disadvantageous in that the circuit arrangements particularly of the comparators 55 and 95, become complicated for selecting the intermediate value in each case.

Moreover, the known predictive coding system of FIGS. 3 and 4 carries out many operations for processing each pixel, so that a high processing speed is required and this is difficult to achieve when the entire arrangement is to be integrated in a single chip. The problem in respect to the processing speed will be further discussed with reference to the encoder of FIG. 3 in which it may be assumed that the delay time of each of the predictive filters 51, 52 and 53 is $\tau 1$, the delay time of the comparator 55 is $\tau 2$, the delay time of the selector 54 is $\tau 3$, the delay time of the subtractor 2 is $\tau 4$, the delay time requantizer 3 is $\tau 5$ and the delay time of the adder 4 is $\tau 6$. In such case, the total delay time $\tau 1 + \tau 2 + \tau 3 + \tau 4 + \tau 5 \tau 6$ should be within the processing time for one pixel. If the sampling frequency has to be approximately 10 MHz to obtain an image, quality close to broadcasting quality, the above total delay time should be within 100 nsec. It is extremely difficult to provide hardware which complies with this condition.

The apparatus for predictive coding according to an embodiment of the present invention, and which avoids the above problems associated with the prior art, will now be described with reference to FIGS. 5 and 6 which respectively show a predictive encoder and a predictive decoder of the apparatus.

It is assumed that the illustrated embodiment of the invention is applied to the highly efficient coding of a color television signal which is separated into a luminance signal Y and two color difference signals R-Y and B-Y. The luminance signal Y and the color difference signals R-Y and B-Y are sampled with a sampling frequency of 13.5 MHz and of 6.75 MHz, respectively, and the sampled data are in the form of 8-bit PCM signals (the so-called 4:2:2 digital standard). These PCM signals are then transmitted by the predictive coding system embodying the invention.

Figure 5:
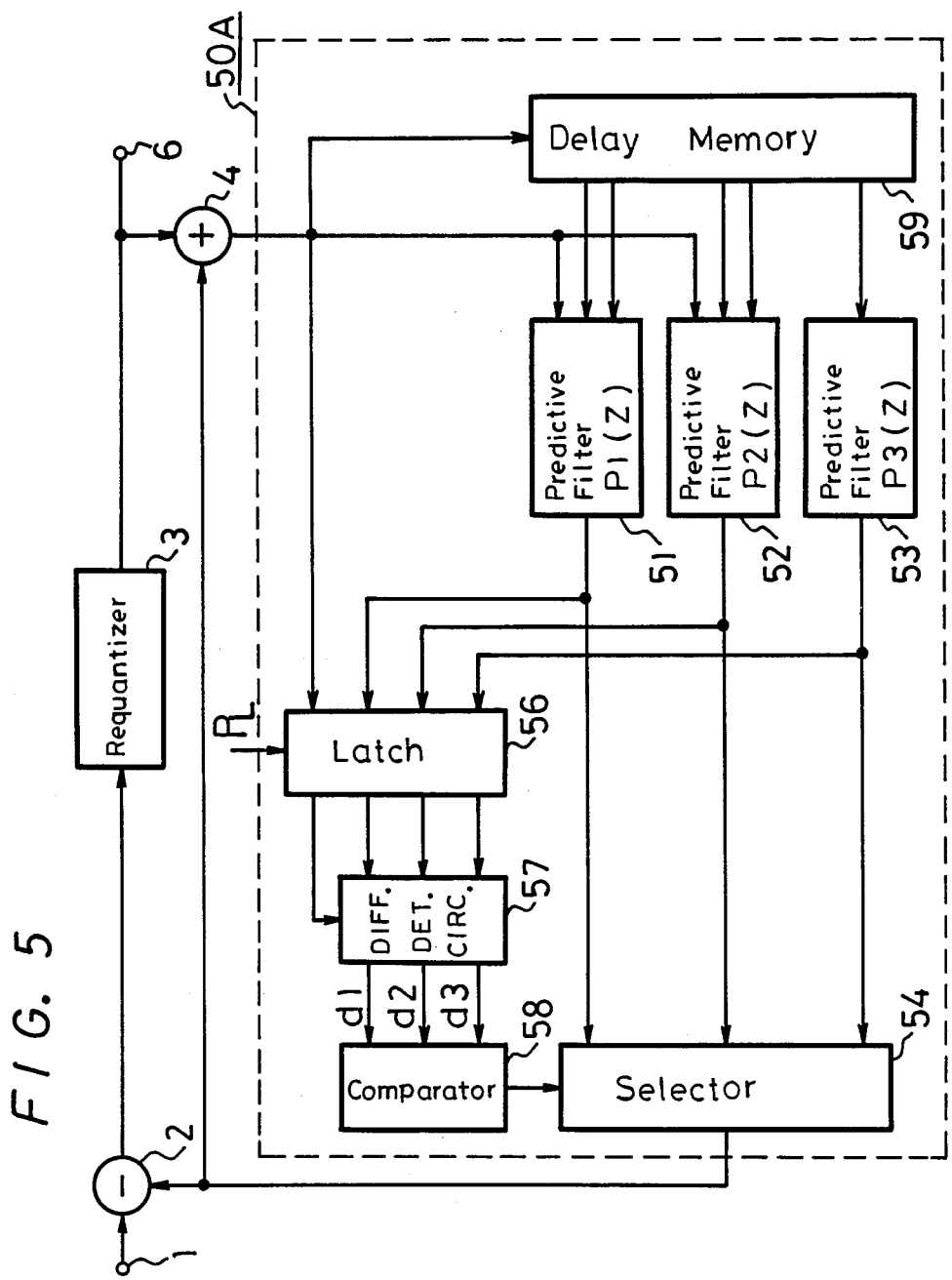
FIG. 5 is a circuit block diagram showing a predictive encoder according to an embodiment of the present invention.
Figure 6:
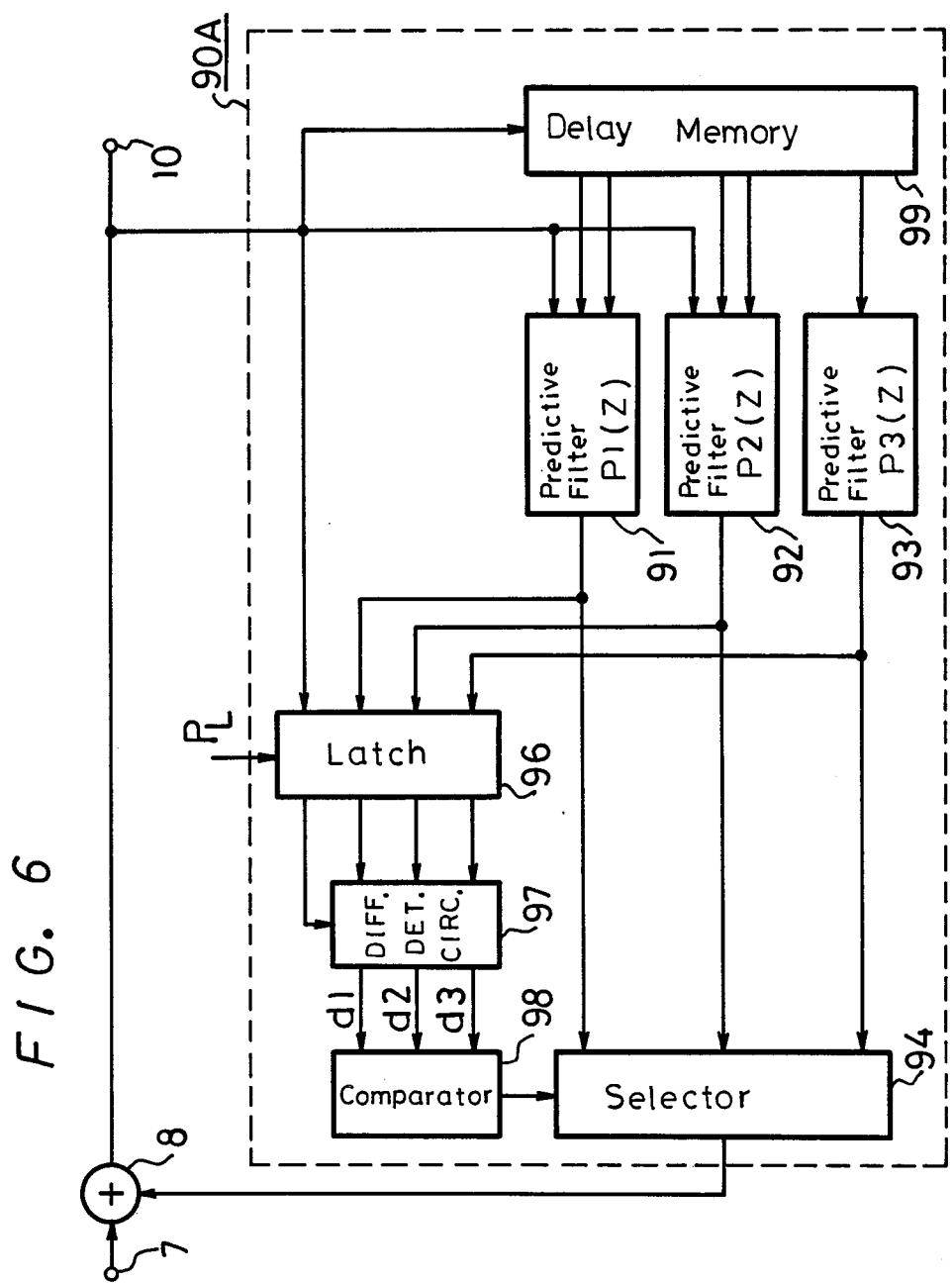
FIG. 6 is a circuit block diagram showing a predictive decoder according to an embodiment of the present invention.

In the embodiment shown in FIGS. 5 and 6, only the predictive filter circuits 50A and 90A are different from the circuits 50 and 90 of FIGS. 3 and 4, and the parts of the circuits 50A and 90A corresponding to those described above with reference to FIGS. 3 and 4 are designated by the same reference numerals.

As is apparent from the drawings, the predictive filter device or circuit 50A arranged in the predictive encoder, that is, the predictive coding part, has exactly the same construction as the predictive filter circuit 90A in the predictive decoder. Therefore, only the predictive filter circuit 50A in the predictive encoder will be hereinafter described in detail, and a detailed explanation of the predictive filter circuit 90A in the decoder will be omitted.

In the predictive filter circuit 50A of FIG. 5, predictive filters 51, 52 and 53 employ the predictive functions or coefficients P1(z) for the in-field prediction, P2(z) for the inter-frame prediction and P3(z) for the inter-field prediction, respectively, in the same manner as in the prior ar example of FIG. 3.

In the embodiment of FIG. 5, the predictive values or output signals from the predictive filters 51, 52 and 53 are supplied to a selector 54 as well as to a latch circuit 56. The latch circuit 56 is also supplied with a comparative signal, that is, data calculated by the adder 4 in adding the requantized data from requantizer 3 to the predictive output signal from the selector 54. It will be appreciated that such comparative signal or value supplied from adder 4 to latch circuit 56 is equal to the desired output to be derived at the terminal 10 of the decoder in FIG. 6.

A latch pulse $P_L$ is supplied to the latch circuit 56 and may be, for example, a sample clock which is synchronized with the sampling period of the data supplied to the input terminal 1. In response to each latch pulse $P_L$, the latch circuit 56 latches the predictive output signals or values from the predictive filters 51, 52 and 53 and the comparative value from the adder 4 which correspond to the next preceding sampling of the input signal.

These values delayed, for example, for one sampling period, through the latch circuit 56 are supplied to a difference detecting circuit 57. The difference detecting circuit 57 detects differences between the comparative value for the next preceding sampling period and respective predictive values or output signals from the predictive filters 51, 52 and 53 for the same preceding sampling period, and provides corresponding difference signals d1, d2 and d3 to a comparator 58.

The comparator 58 sequentially compares these difference signals d1, d2 and d3 with each other in a so-called "round robin" manner and determines the smallest of the difference signals d1, d2 and d3. Further, the comparator 58 provides a corresponding selector control signal to the selector 54 so that the latter selects the predictive output signal or value from the one of the predictive filters or predictors 51, 52 and 53 corresponding to the difference signal d1, d2 or d3 which is determined to be smallest for the next preceding sampling period, that is, with a time delay equal to the time between successive samplings. In other words, the latch circuit 56, difference detecting circuit 57 and comparator 58 determine which of the predictive values obtained by the predictive functions or coefficients $Pl(z)$, $P2(z)$ and $P3(z)$ of the predictors 51, 52 and 53, respectively, is closest to the comparative value from adder 4 at the time of the next preceding sampling period. Thus, the comparison is effected based upon the comparative value and the predictive values at the time of the next preceding sampling period. Accordingly, the output from a predictive filter assumed to be optimal at the time of the next preceding sampling period is selected as the predictive output for the next input data.

When pixels located three-dimensionally adjacent to each other, such as, data representative of an image, have generally high correlation, the optimal predictive function for the data in the next preceding sampling period is very probably also the optimal function for the next sample. Therefore, the coding method according to this invention, as described above, is highly effective in information compression.

More particularly, for obtaining an image of high quality, such as, broadcasting quality, the sampling frequency is set at a relatively high value so that there is an intimate correlation between adjacent pixels. In that case, it is highly probable that the predictive function that is optimal for the next preceding sampling period is also optimal for the following sampling period.

The above-mentioned arrangement is also advantageous in the case where more than three predictive functions are provided, as compared with the previously proposed arrangement which selects a predictive function corresponding to the intermediate value. More specifically, since the arrangement according to the present invention is operative to select the optimal predictive function for the next preceding sampling period, the number of predictive functions can be increased so that the characteristics of the selected predictive function can be determined in a finer manner, to thereby increase the effect on the information compression.

Since the comparator 58 compares the differences d1, d2, d3 between the comparative value from the adder 4 and the predictive values or output signals from the predictors 51, 52 and 53 in a round robin fashion, it is quite easy to select an optimal value from even four or eight predictive functions. Incidentally, the comparison in a round-robin fashion can be rationally effected.

A further advantage afforded by the present invention is that an increase in the number of predictive functions can correspondingly improve the accuracy. This is quite contrary to the previously proposed intermediate value selecting method in which the provision of more than three predictive functions makes the hardware construction extremely complicated and requires a relatively long processing time.

The system according to the present invention requires as a processing time only the larger one of the delay $\tau 1$ of the predictive filter or the total delay $\tau 2'$ of the latch circuit 56, the detecting circuit 57 and the comparator 58. Thus, the processing time for the system according to the present invention can be reduced as compared with the previously proposed system which requires a processing time equal to the sum of $\tau 1$ and $\tau 2'$. To be more specific, the processing time required for one sampling process in the system according to the present invention is $\tau 1$ or $\tau 2'$, whichever is larger, $+\tau 3 +\tau 4 +\tau 5 +\tau 6$, which is less, by either $\tau 1$ or $\tau 2$, than the processing time required in the described system according to the prior art. The foregoing advantages flow from an important feature of the present invention, namely, latching data for the next preceding sample in the latch circuit 56 and selecting the optimal predictive function for the following sample on the basis of the latched data for that next preceding sample.

Incidentally, it may be possible to determine the optimal predictive filter on the basis of earlier sampled data, for example, data sampled two or three sampling periods earlier, and then to use such optimal predictive filter for the current data. For example, the optimal predictive filter may be determined on the basis of data from the preceding three samples. If the same filter has been selected more than twice, it is selected again. If different filters have been selected for three successive sampling periods, the optimal predictive filter determined on the basis of the next preceding sampling is selected.

As earlier noted, the predictive filter circuit 90A of the decoder embodying this invention is shown to include, beyond the parts thereof included in the previously described circuit 90, a latch circuit 96, a difference detecting circuit 97 and a comparator 98. The latch circuit 96, difference detecting circuit 97 and comparator 98 function similarly to the latch circuit 56, difference detecting circuit 57 and comparator 58, respectively, to control the selector 94 so that the latter passes to adder 8 the predictive value or output signal from the predictor 91, 92 or 93, which for the next preceding sample, corresponds to the smallest difference signal d1, d2 or d3.

Although the invention has been described above in its application to data representative of a moving image, such as, a television image or the like, it is to be understood that the present invention is not limited to such data and can be applied to other information signals, for example, to audio data.

By way of summary, it is a feature of coding systems according to the present invention that the predictive filters can be controlled in a finer manner and the information compression property can be improved by employing, for coding the next sample, an optimal predictive function which minimizes the difference between the predictive value resulting from the predictive function and the comparative value for at least one preceding sample. Further, in coding systems according to the invention, it is not necessary to transmit the selection control information.

Moreover, systems according to the present invention can employ relatively simple hardware which is relatively unrestricted by the processing speed, and which is suitable to be integrated in a single chip.

Although a single preferred embodiment of the invention has been described above in detail, it will be apparent that the invention is not limited to that precise embodiment, and that many modifications and variations can be effected therein by one skilled in the art without departing from the spirit or scope of the invention as defined by the appended claims.

What is claimed is:

1. In a predictive encoding method for transmitting a residual signal determined by the difference between an input signal, which represents image information having field and frame intervals, and a predictive signal, the steps of:

Applying a comparative signal based on said input signal to a plurality of predictors which include at least an in-field predictor, an inter-frame predictor and an inter-field predictor, and which have difference respective predictive functions;

comparing said comparative signal with each of a plurality of predictive output signals from said predictors, respectively, so as to obtain a plurality of respective difference signals;

selecting, with a predetermined time delay, the one of said predictors corresponding to the smallest of said difference signals; and subtracting said predictive output signal of said one predictor from the current input signal for determining said residual signal to be transmitted.

2. In a predictive encoding method for transmitting a residual signal determined by the difference between an input signal, which is digital data obtained by periodic sampling of an information signal, and a predictive signal, the steps of:

applying to a plurality of predictors having different respective predictive functions a comparative signal based on said input signal;

comparing said comparative signal with each of a plurality of predictive output signals from said predictors, respectively, so as to obtain a plurality of respective difference signals;

selecting, with a predetermined time delay, the one of said predictors corresponding to the smallest of said difference signals, said predetermined time delay being equal to a period between successive samplings so that said one predictor which is selected for each said sampling corresponds to the smallest of the difference signals for the next preceding sampling; and subtracting said predictive output signal of said one predictor from the current input signal for determining said residual signal to be transmitted.

3. In a predictive decoding method for decoding an original signal from an input residual signal, which represents image information having field and frame intervals, by adding to the input residual signal a predictive signal, the steps of:

applying a decoded signal to a plurality of predictors having different respective predictive functions and which include at least an in-field predictor, an inter-frame predictor and an inter-field predictor;

comparing said decoded signal with each of a plurality of predictive output signals from said predictors, respectively so as to obtain a plurality of respective difference signals;

selecting, with a predetermined time delay, the one of said predictors corresponding to the smallest of said difference signals; and adding to said input residual signal the current predictive output signal from said one predictor so as to obtain the decoded original signal.

4. In a predictive decoding method for decoding an original signal from an input residual signal, which is digital and has a predetermined sampling rate, by adding to the input residual signal a predictive signal, the steps of:

applying a decoded signal to a plurality of predictors having different respective predictive functions;

comparing said decoded signal with each of a plurality of predictive output signals from said predictors, respectively, so as to obtain a plurality of respective difference signals;

selecting, with a predetermined time delay, the one of said predictors corresponding to the smallest of said difference signals; and adding to said input residual signal the current predictive output signal from said one predictor so as to obtain the decoded original signal;

said predetermined time delay being equal to a period between successive samplings so that said one predictor which is selected for adding of its current predictive output signal to said input residual signal corresponds, during the next preceding sampling, to the smallest of said difference signals.

5. A predictive encoder for an input signal which represents image information having field and frame intervals, comprising:

a plurality of predictors having different predictive functions, respectively, and which include at least an in-field predictor, an inter-frame predictor and an inter-field predictor;

means for supplying to all of said predictors a comparative signal based on said input signal;

difference detecting means for detecting differences between said comparative signal and each of a plurality of predictive output signals from said predictors, respectively, so as to obtain a plurality of respective difference signals;

means for selecting the one of said predictors corresponding to the smallest of said difference signals with a predetermined time delay; and means for providing a residual signal to be transmitted by subtracting, from the current input signal, the predictive output signal then output by said one predictor selected on the basis of the smallest of said difference signals delayed said predetermined time.

6. A predictive encoder for an input signal comprised of digital data obtained by periodic sampling of an information signal, comprising:

a plurality of predictors having a different predictive functions, respectively;

means for supplying to all of said predictors a comparative signal based on said input signal;

difference detecting means for detecting differences between said comparative signal and each of a plurality of predictive output signals from said predictors, respectively, so as to obtain a plurality of respective difference signals;

means for selecting the one of said predictors corresponding to the smallest of said difference signals with a predetermined time delay, said predetermined time delay being to a period between successive samplings so that said one predictor which is selected for each said sampling corresponds to the smallest of said difference signals for the next preceding sampling; and means for providing a residual signal to be transmitted by subtracting, from the current input signal, the predictive output signal then output by said one predictor selected on the basis of the smallest of said difference signals delayed said predetermined time.

7. A predictive encoder according to claim 6; in which said difference detecting means includes latch means receiving said comparative signal and said predictive output signals and being latched upon each sampling of said input signal, and a difference detecting circuit receiving said comparative signal and said predictive output signals delayed said period between successive samplings each time said latch means is latched for providing said difference signals therefrom; and said means for selecting includes comparator means receiving said difference signals from said latch means and providing a selector control signal corresponding to the smallest of said difference signals, and a selector circuit connected with said predictors and controlled by said selector control signal to transmit to said means for providing the residual signal the predictive output signal from the predictor which, in the previous sampling, corresponds to said smallest difference signal.

8. A predictive encoder for an input signal comprising:

a plurality of predictors having different predictive functions, respectively;

means for supplying to all of said predictors a comparative signal based on said input signal;

difference detecting means for detecting differences between said comparative signal and each of a plurality of predictive output signals from said predictors, respectively, so as to obtain a plurality of respective difference signals;

means for selecting the one of said predictors corresponding to the smallest of said difference signals with a predetermined time delay; and means for providing a residual signal to be transmitted by subtracting, from the current input signal, the predictive output signal then output by said one predictor selected on the basis of the smallest of said difference signals delayed said predetermined time;

said means for supplying to all of said predictors a comparative signal based on said input signal including means for requantizing said residual signal, and adder means for adding the requantized residual signal and the predictive output signal from said one selected predictor.

9. A predictive decoder for decoding an original signal from an input residual signal, which represents image information having field and frame intervals, by adding a predictive signal to the input residual signal, comprising:

a plurality of predictors having different respective predictive functions and including at least an infield predictor, an inter-frame predictor and an inter-field predictor;

means for applying a decoder signal to said plurality of predictors;

means for comparing said decoded signal with each of a plurality of predictive output signals from said predictors, respectively, so as to obtain a plurality of respective difference signals;

means for selecting the one of said predictors corresponding to the smallest of said difference signals with a predetermined time delay; and means for adding to said input residual signal the current predictive output signal from said one predictor so as to obtain the decoded original signal.

10. A predictive decoder for decoding an original signal from an input residual signal, which is digital and has a predetermined sampling rate, by adding a predictive signal to said input residual signal, comprising:

a plurality of predictors having different respective predictive functions;

means for applying a decoded signal to said plurality of predictors;

means for comparing said decoded signal with each of a plurality of predictive output signals from said predictors, respectively, so as to obtain a plurality of respective difference signals;

means for selecting the one of said predictors corresponding to the smallest of said difference signals with a predetermined time delay; and means for adding to said input residual signal the current predictive output signal from said one predictor so as to obtain the decoded original signal;

said predetermined time delay being equal to a period between successive samplings so that said one predictor which is selected for adding of its current predictive output signal to said input residual signal corresponds, during the next preceding sampling, to the smallest of said difference signals.

11. A predictive decoder according to claim 10; in which said means for obtaining said difference signals includes latch means receiving said decoded signal and said predictive output signals and being latched upon each sampling of said input signal, and a difference detecting circuit receiving said decoded signal and said predictive output signals delayed said period between successive samplings each time said latch means is latched for providing said difference signals therefrom; and said means for selecting includes comparator means receiving said difference signals from said latch means and providing a selector control signal corresponding to the smallest of said difference signals, and a selector circuit connected with said predictors and controlled by said selector control signal to transmit to said means for adding the predictive output signal from the predictor which, in the previous sampling, corresponds to said smallest difference signal.

* * * * *